United States Patent
Livshiz et al.

(10) Patent No.: US 6,305,350 B1
(45) Date of Patent: Oct. 23, 2001

(54) ENGINE SPEED CONTROL

(75) Inventors: Michael Livshiz, Ann Arbor; Scott Joseph Chynoweth, Fenton; Sharanjit Singh, Novi, all of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/597,217

(22) Filed: Jun. 20, 2000

(51) Int. Cl.[7] .............................. F02D 41/16; F02D 43/00
(52) U.S. Cl. .................................... 123/339.11; 123/339.2; 123/352; 701/110
(58) Field of Search ..................... 123/339.11, 339.16, 123/339.18, 339.19, 339.2, 352; 701/102, 110

(56) References Cited

U.S. PATENT DOCUMENTS

| | | | |
|---|---|---|---|
| 5,421,302 | 6/1995 | Livshits et al. | 123/339.23 |
| 5,463,993 | 11/1995 | Livshits et al. | 123/339.2 |
| 5,577,474 | 11/1996 | Livshiz et al. | 123/352 |
| 5,996,553 | 12/1999 | Sanvido et al. | 123/339.23 |
| 6,016,460 * | 1/2000 | Olin et al. | 701/102 |

\* cited by examiner

Primary Examiner—Tony M. Argenbright
(74) Attorney, Agent, or Firm—Anthony Luke Simon

(57) ABSTRACT

An idle control system for internal combustion engines providing load rejection and/or load compensation for a given engine. speed reference and barometric pressure wherein the present invention accommodates for varying engine speed references and for varying barometric pressures, such as at different altitudes. The control system incorporates a load compensator, and a control structure including a multitude of sub-control blocks. The load compensator generates the needed airflow to compensate for the torque of engine loads and works with a feed-forward controller to reject anticipated loads. The calibration procedure is fully automated.

12 Claims, 7 Drawing Sheets

ENGINE SPEED CONTROL

TECHNICAL FIELD

The present invention relates to load compensation for internal combustion engine speed control.

BACKGROUND OF THE INVENTION

Conventional internal combustion engine idle speed control systems make use of a proportional-integral-differential (PID) controller of air and a proportional controller of spark. The bandwidth of a PID controller is limited and, to obtain the required accuracy, idle speed control systems rely mainly on feed-forward airflow compensation. The typical feed-forward controller has tens of lookup tables.

The idle control systems, described in U.S. Pat. No. 5,463,993 to Livshits et al, in U.S. Pat. No. 5,421,302 to Livshits et al, and in U.S. Pat. No. 5,577,474 to Livshiz et al, each being assigned to the assignee of this application, and each being hereby incorporated herein by reference, enable significant improvement of idle speed control performance.

The controller described in U.S. Pat. No. 5,463,993 combines load rejection and steady state control but requires very qualified people to calibrate, must be defined for all environmental conditions, and requires accurate physical based models. In the implementation of the idle speed controllers, described in U.S. Pat. No. 5,463,993 and U.S. Pat. No. 5,421,302, oscillations of engine speed (RPM) were found in different altitudes under multiple park-drive transitions. Furthermore, the controller described in U.S. Pat. No. 5,463,993 does not have separation of mass airflow and throttle position control. This means that every change of the actuator will require a re-calibration of this controller for all altitudes.

The controller described in U.S. Pat. No. 5,577,474 incorporates the effects of slowly varying parameters into the idle speed control system but does not take into account initial operation at different altitudes, takes a long time to adapt the model to slowly varying variables, such as barometric pressure, and contains a multitude of lookup tables.

What is needed is a robust idle speed controller incorporating load rejection with barometric correction for different altitudes.

SUMMARY OF THE INVENTION

The present invention is an idle control system for internal combustion engines providing load rejection and/or load compensation for a given engine speed reference and barometric pressure wherein the present invention accommodates for varying engine speed references and for varying barometric pressures, such as at different altitudes. The present invention consists of a control system incorporating a Load Compensator, including a multitude of sub-control blocks, as depicted in FIG. 1, to be described later.

This invention is a method to improve performance, improve repeatability of calibration, and reduce calibration efforts of an idle speed control system. It can be used in both engine speed control and coast-down control. This is achieved through an accurate estimation of mass airflow (MAF) as a function of engine speed, torque, and barometric pressure (B), by a separation of load rejection and steady state control, and increasing engine damping as a function of manifold air pressure (MAP) and B.

The present invention may be used to replace the Torque Controller, MAP Controller, and State Estimator in the idle control system described in U.S. Pat. No. 5,463,993 or as an independent unit as part of any other engine speed or coast-down control incorporated in an idle control system.

The present invention provides both spark advance (S) and throttle control based on MAP and engine speed. The throttle control portion consists of a RPM (engine speed) Controller, Load Compensator, Feed-forward Controller and Mass AirFlow/Idle Air Command (MAF/IAC) Converter. The Load Compensator generates the needed airflow to compensate for the torque of the engine load. The Load Compensator compensates for unexpected loads and works with the Feed-forward Controller to reject anticipated loads.

The calibration procedure is fully automated and is shown in FIGS. 3, 4, and 5A–5D, to be described later. The number of calibration var and the number of lookup tables is reduced by a factor of eight. The automated calibration increases the repeatability of the control system.

It is therefore an object of the present invention to provide improved performance, improved repeatability of calibration, and reduced calibration efforts of an engine idle speed control system.

This and additional objects features of the present invention will become apparent from the following specifications.

DETAILED DESCRIPTION OF THE PREFERRED EMBODIMENT

Figure 1:
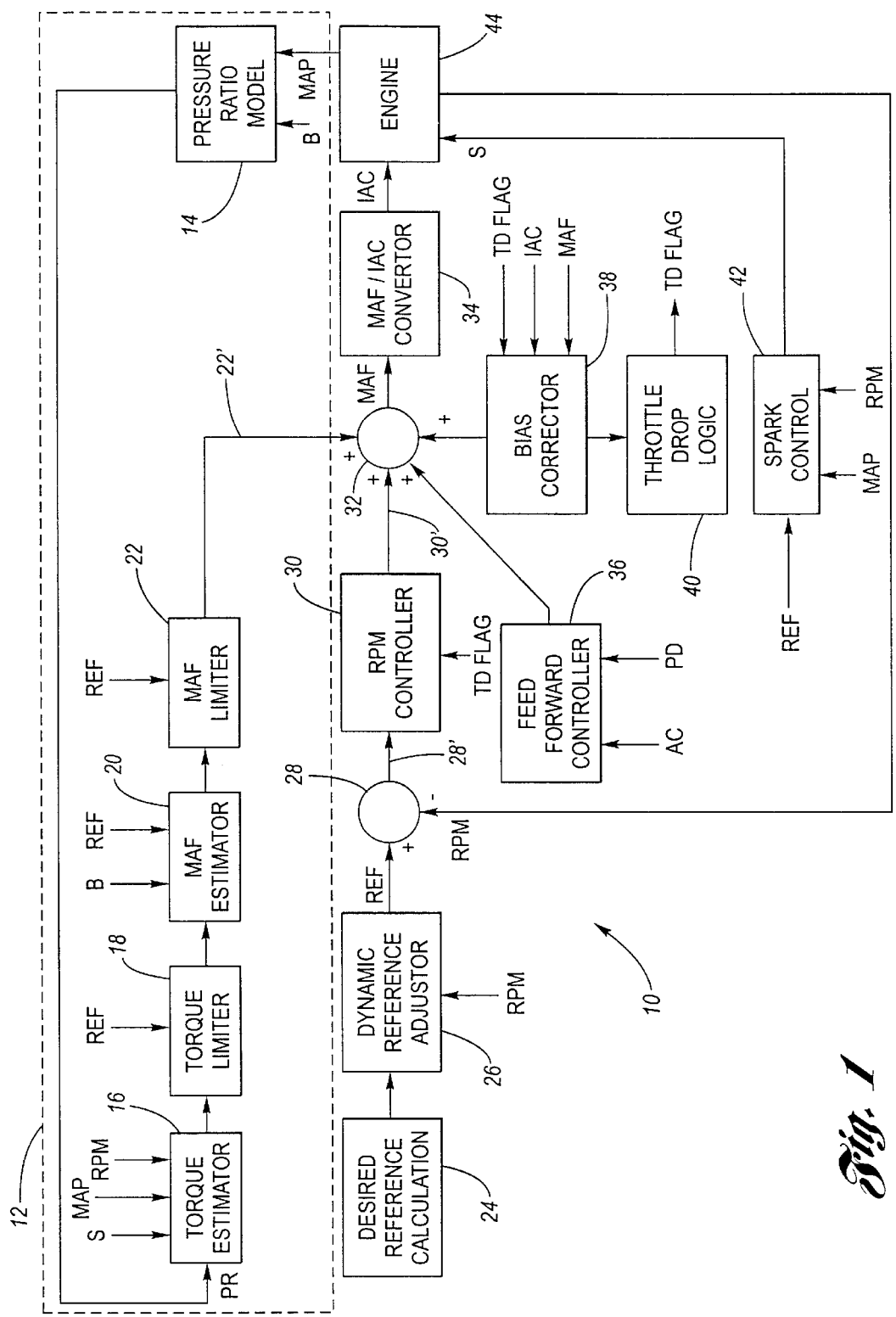
FIG. 1 is a schematic representation of the control system provided in accord with the preferred embodiment of this invention.

FIG. 1 is a schematic representation of the control system 10 provided in accord with the preferred embodiment of the present invention. The control system 10 controls the engine 44 and consists of a control structure incorporating control blocks 24 to 42 and a Load Compensator 12 incorporating control blocks 14 to 22.

The Load Compensator 12 consists of five units: Pressure Ratio (PR) Model, block 14, Torque Estimator, block 16, Torque Limiter, block 18, Mass Airflow (MAF) Estimator, block 20, and MAF Limiter, block 22. The Load Compensator 12 compensates for unexpected loads and works with a Feed-forward Controller 36 to reject anticipated loads. The Load Compensator 12 generates the needed airflow via signal line 22'to compensate for the torque of an engine load through MAF module 32. A mathematical description of the Load Compensator 12 may be presented through parameters $T_{ss}$ and $MAF_{load\ ss}$, to be described later. In transition mode, to be defined later, the changes of airflow generated by the Load Compensator 12 must be relatively small. In normal mode, to be defined later, the Load Compensator 12 plays the main role in the load rejection. The calibration of the Load Compensator 12 is fully automated through the calibration process given in FIGS. 3, 4, and 5A through 5D to be described later.

The Pressure Ratio Model 14 is developed to compensate for the altitude effect on the torque model described in U.S. Pat. No. 5,421,302 and to increase the damping of the control system for different altitudes, eliminating engine speed oscillations under park-drive transitions. The Pressure Ratio Model 14 defines the ratio between MAP at different altitudes to MAP calculated under normal conditions as a function of MAP and B. The Pressure Ratio is defined as:

$$PR=MAP_{99}/MAP_i=f(MAP, B), \quad (1)$$

where $MAP_{99}$ and $MAP_i$ are manifold air pressures computed for a given engine speed and load for a barometric pressure B equal to 99 Kilo-Pascals (KPa) and "i", respectively.

Figure 2:
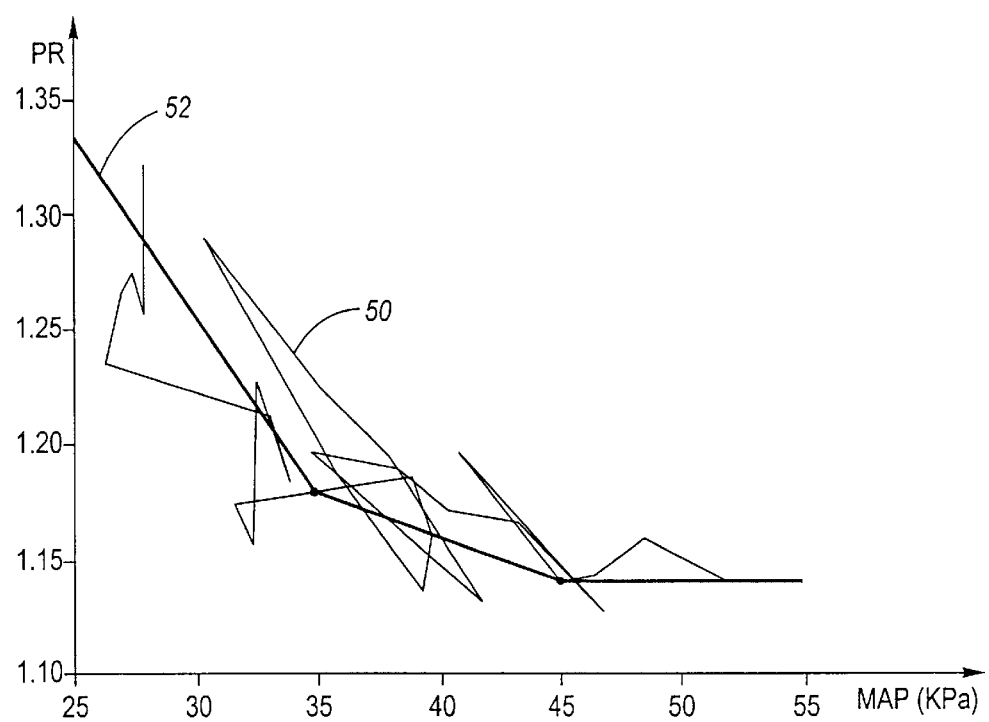
FIG. 2 is a typical plot of pressure ratio versus MAP at a barometric pressure B of 70 KPa.

FIG. 2 is an example of a typical plot of pressure ratio versus MAP at a barometric pressure B of 70 KPa. In FIG. 2, line 50 represents the empirical data, whereas line 52 represents a mathematical best fit to the empirical data. The introduction of manifold air pressure in this model enables the damping of the control system to be increased.

The Torque Estimator 16 calculates needed engine torque based on MAP, spark advance (S), pressure ratio (PR) and engine speed (RPM). Torque is limited both low and high via control block 18 based on steady state data for a given engine speed reference. The Torque Estimator 16 is the model described in U.S. Pat. No. 5,421,302 and in U.S. Pat. No. 5,577,474 with a small modification. The expression for the steady state torque may be presented in the form:

$$T_{SS}=a_{t1}*RPM+a_{t2}*RPM^2+a_{t3}*PR*MAP+a_{t4}*S+a_{t5}*S^2+a_{t6}*S*RPM, \quad (2)$$

where the coefficients $a_{t1}$ through $a_{t6}$ are obtained through the calibration process given in FIGS. 3, 4, and 5A through 5D, to be described later.

The MAF Estimator 20 calculates needed mass airflow as a function of desired reference speed (Ref), required engine torque, and barometric pressure (B). The estimated mass airflow is limited both high and low for each engine speed reference via the MAF limiter 22. The MAF Estimator 20 enables the separation of load rejection and steady state control and makes the control system independent of the actuator. The MAF Estimator 20 computes how much airflow is required to reject the estimated torque when the reference is "Ref" for a given barometric pressure B, and can be mathematically described as:

$$MAF_{load\ ss}=a_{m1}*Ref+a_{m2}*Ref^2+a_{m3}*T+a_{m4}*T^2+a_{m5}*T*Ref+a_{m6}*B+a_{m7}*B^2+a_{m8}, \quad (3)$$

where the coefficients $a_{m1}$ through $a_{m8}$ are obtained through the calibration process given in FIGS. 3, 4, and 5A through 5D, to be described later.

The description, operation, and mathematical analysis of each individual control block 24 to 42 of the control structure are presented in U.S. Pat. No. 5,421,302, U.S. Pat. No. 5,577,474, and U.S. Pat. No. 5,577,474, and are (as above referenced) incorporated herein by reference. A description of the functions of control blocks 24 to 42 within the context of the present invention follows.

The Desired Reference Calculation, control block 24, takes basic reference engine speed calculated by the idle subsystem and calculates the desired and current engine speed references. The actual reference to which the system is controlled is the current reference. It is essentially a filtered desired reference used to avoid large steps in the reference engine speed. The change of the current reference is enabled in normal mode only when error of engine speed tracking is small. Current reference is set equal to current engine speed when entering engine speed control. Current reference is then updated toward desired reference based on the reference step size tables for normal and transition modes.

The Dynamic Reference Adjuster 26 increases the reference idle speed in the case of high engine speed oscillations, a throttle drop anticipate situation, and failure mode. In the case of high engine speed oscillations, the Dynamic Reference Adjuster 26 sets a dynamic reference offset and enables a return to the normal reference only after some time delay within which the engine dynamics are stable. Other offsets to the desired reference are set if the throttle drop anticipate (TD flag) or failure mode flags are set accordingly.

The RPM Controller 30 takes engine speed reference error from control block 28 via signal line 28' and generates a MAF signal via signal line 30' and also has load rejection capability. The RPM Controller 30 uses a combination of proportional and integral control methods. In normal mode, the integral control corrects for model inaccuracies and helps to reject loads. However, the Load Compensator 12 does the main load rejection in normal mode. The authority of the RPM Controller 30 in normal mode is very limited and it reacts on error slowly, for example every 400 milliseconds. In transition mode, integral control has a lot of authority and reacts on error very quickly, for example every 25 milliseconds. Integral control is enabled if the Throttle Drop flag (TD flag) is not set; the average integral error is greater than a calibrated value, normal mode is not active, and Feed-forward Controller 36 is not active. The value of the integral control step is different for transition and normal modes. The value of the MAF signal on signal line 30' is increased by the value of a variable labeled step if the absolute error is greater then a calibrated value. The MAF based on integral control may be written:

$$MAF_{int}=MAF_{int}+step. \quad (4)$$

Proportional control is optional only in transition mode and its authority must be very limited for stability reasons. The MAF based on proportional control may be written:

$$MAF_{RPM}=MAF_{int}+b*MAF_{prop}, \quad (5)$$

where the value of b is 1 in transition mode (if used) and the value of b is 0 in normal mode. Proportional control is used in transition mode only if it is absolutely necessary.

To satisfy all engine speed control requirements, specifically multiple loads, the air conditioning (AC) and transmission park-drive (PD) shift loads must be anticipated. The Feed-forward Controller 36 anticipates the engine behavior and adds additional airflow to compensate for AC and/or PD loads and also increases the spark authority (S) available prior to the loads being applied.

When a load request occurs, MAF commanded by the Feed-forward Controller 36 is increased. This leads to an engine torque growth. To compensate, the spark advance (S) goes down, stabilizing engine speed according to the reference. This lower level of spark before the load is applied allows a larger torque change due to spark when the load is actually applied. When the load is applied, the spark advance increases, the engine rejects the load, and the spark advance goes back. Then the MAF commanded by the Feed-forward Controller 36 is slowly integrated out. The feed-forward MAF is equal to the sum of the AC and PD contributions.

The Bias Corrector 38 adds extra airflow to compensate for lost IAC steps that can result in instability of the control system. The Bias Corrector 38 also enables the TD flag if a throttle drop situation exists if determined by the Throttle Drop Logic control block 40. The difference between MAF commanded and MAF measured, filtered over time, is used to calculate the bias. If in transition mode and MAF error is large, the large step size and small filter is used, otherwise the small step size and large filter is used. The conditions under which the bias is updated are that normal mode is enabled, the TD flag is cleared, and the failure mode flag is cleared.

The Throttle Drop Logic, control block 40, analyzes the existence of a potential situation of throttle drop (small throttle opening). This analysis is done based on throttle information and the error between commanded and estimated airflow. When the Throttle Drop Logic, control block 40, sets the flag, the system freezes the bias update and the integral control of MAF by the RPM Controller 30.

MAF Control, block 32, computes commanded mass airflow. The total commanded mass airflow is the combination of mass airflow generated by RPM Controller 30, Load Compensator 12, Feed-forward Controller 36, and Bias Corrector 38 and may be expressed as:

$$MAF_{com}=MAF_{RPM}+MAF_{load\ ss}+MAF_{ff}+a*MAF_{bias}, \quad (6)$$

where the value of a is 1 in normal mode and the value of a is zero in transition mode.

The MAF/IAC Converter 34 transforms commanded airflow into commanded throttle position and estimated bias of control.

Spark Control, block 42, generates base idle spark for neutral and drive and spark correction based on engine speed error. Spark Control, block 42, may be proportional or predictive and takes into account coolant offsets, minimum and maximum limits, and other necessary parameters. The output of Spark Control, block 42, is the spark advance (S) used for torque calculations to control calculated torque and mass airflow and is also the delivered spark value to the engine 44.

The present invention allows for smooth and robust transitions to and from idle modes with no possibility of engine stall. Entry to idle can be from Crank, Coastdown, or Throttle Follower modes. In any case, the entry is accomplished through a transition mode that provides necessary robustness to prevent stalls. Moreover, RPM Controller 30 using integral control in transition mode handles the difference in MAF. Exit from idle can lead to MAF discontinuity between MAF commanded by the idle mode and the MAF commanded by the exited mode, which could lead to harsh performance and stall possibilities. To prevent this from happening the difference between the MAF commanded upon exit is added to the MAF commanded by the exited mode. This difference is then linearly ramped down with respect to time.

The transition to normal mode is enabled only when spark advance is closed or equal to the basic spark advance, the bias valid flag is set (absolute MAF error is less than the calibrated value and the bias valid check is enabled), the transient MAF error is small, the coolant temperature is greater than a calibrated value, and the difference between current and desired reference engine speed is small or zero.

Figure 3:
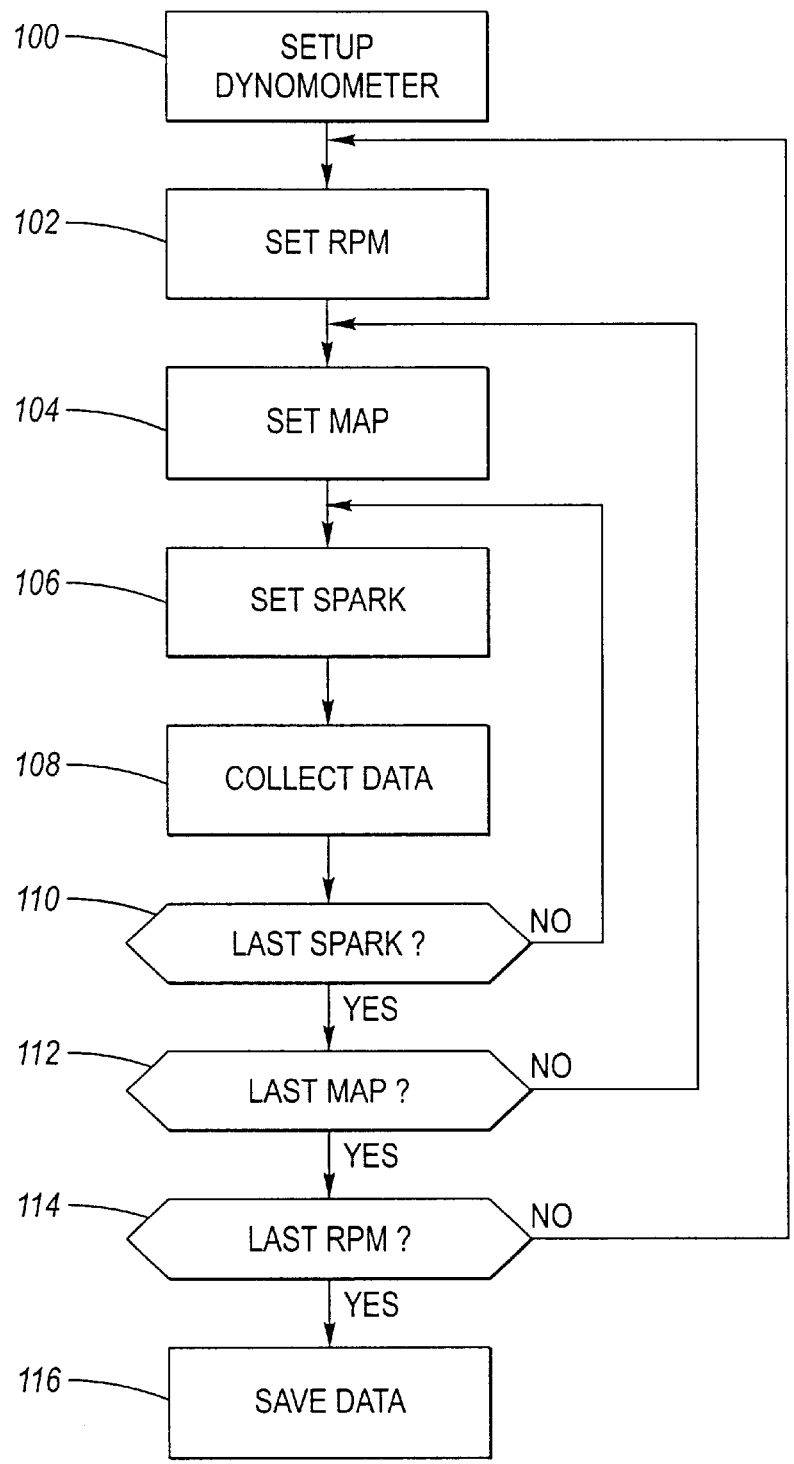
Figure 4:
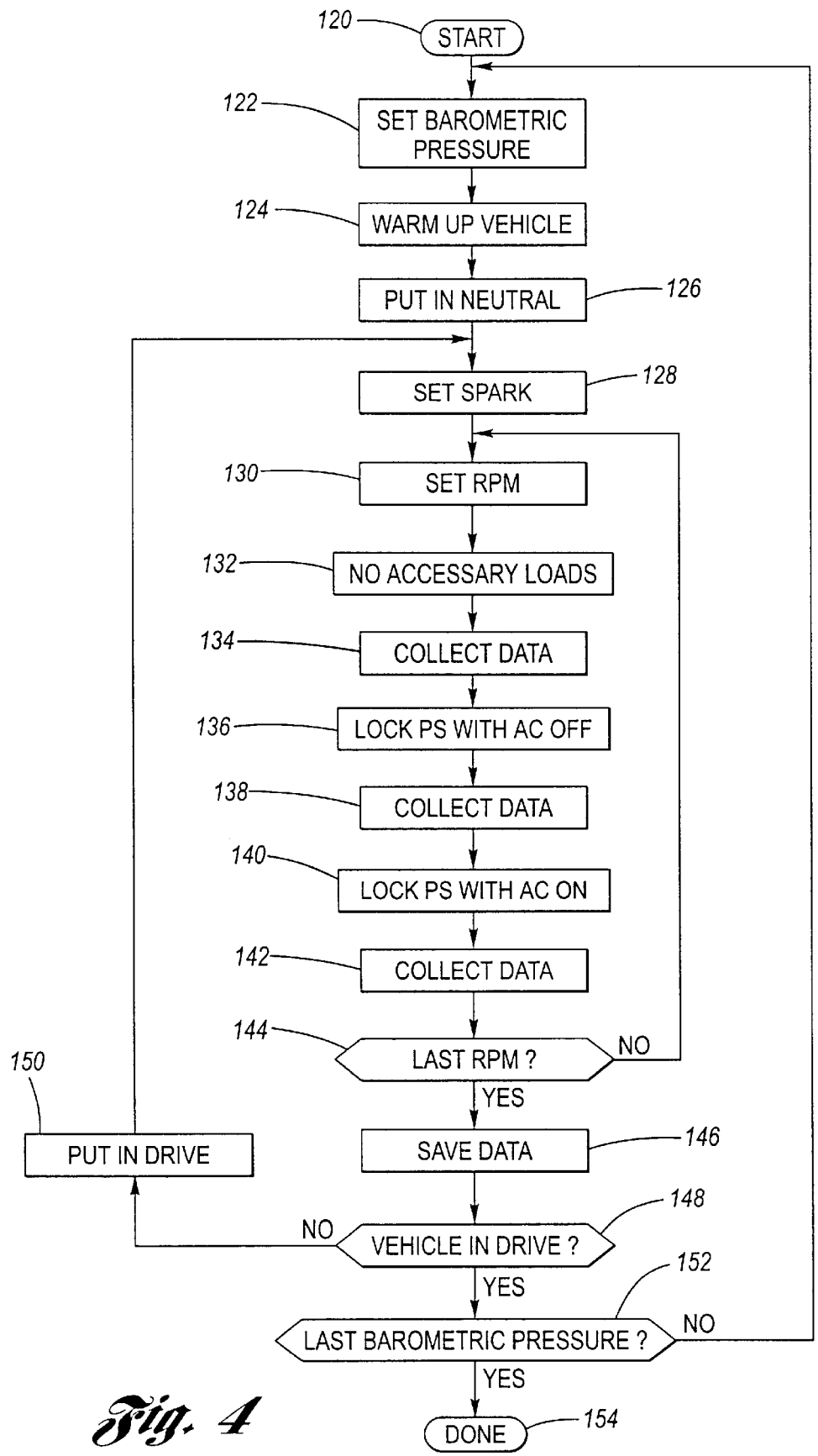

An automated calibration procedure as presented in FIGS. 5A through 5D allows a simplified control system calibration. The first stage is the idle steady state mapping done on an engine dynamometer in which torque data is collected as shown in FIG. 3. The calibration procedure shown in FIGS. 5A through 5D will automatically generate the coefficients for the torque model. The second stage is the idle steady state mapping of data in the vehicle at the different altitudes as depicted in FIG. 4. The calibration procedure depicted in FIGS. 5A through 5D is based on data collected at different places at different altitudes providing for varying barometric pressures.

The procedure for collecting the idle steady state dynamometer torque data is presented in FIG. 3. In FIG. 3, a dynamometer is set up in block 100 according to procedures well known to those skilled in the art. RPM is set in block 102, MAP in block 104, and spark in block 106. Data is then collected at block 108. If the last spark value has been set, decision block 110 transfers control to decision block 112. Otherwise, control is transferred to block 106. If the last MAP has been set, decision block 112 transfers control to block 114. Otherwise control is transferred to block 104. If the last RPM has been set, decision block 114 transfers control to block 116. Otherwise, control is transferred to block 102. The collected data is saved at block 116.

The procedure for collecting the idle steady state in vehicle data is presented in FIG. 4 and is well known to those skilled in the art. The procedure starts at block 120 and proceeds to block 122. At block 122, the barometric pressure is set by placing the vehicle at a specified altitude at which the vehicle is warmed up at block 124 and placed in neutral at block 124. Spark is set in block 128, RPM is set in block 130, block 132 ensures that no accessory loads are turned on, and data is collected at block 134. At block 136, the power steering (PS) is locked and data is collected at block 138. At block 140, the PS is locked and the air-conditioning (AC) is turned on and data is collected at block 142. If the last RPM value has been set, decision block 144 transfers control to block 146. Otherwise, control is transferred to block 130. The data is saved at block 146. If the vehicle is in drive, decision block 148 transfers control to block 152. Otherwise, control is transferred to block 150 where the vehicle is placed in drive after which control passes to block 128. If the last barometric pressure has been set, the procedure terminates at block 154. Otherwise, control is transferred to block 122.

Figure 5B:
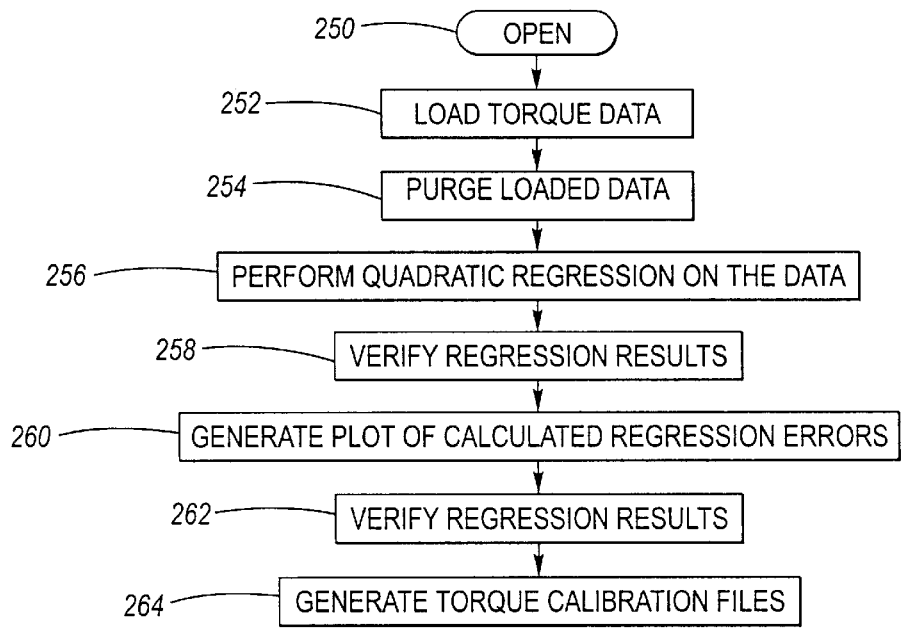
FIGS. 3, 4, and 5A–5D are control flow diagrams illustrating the steps used to carry out the present invention in accord with the preferred embodiment.
Figure 5A:
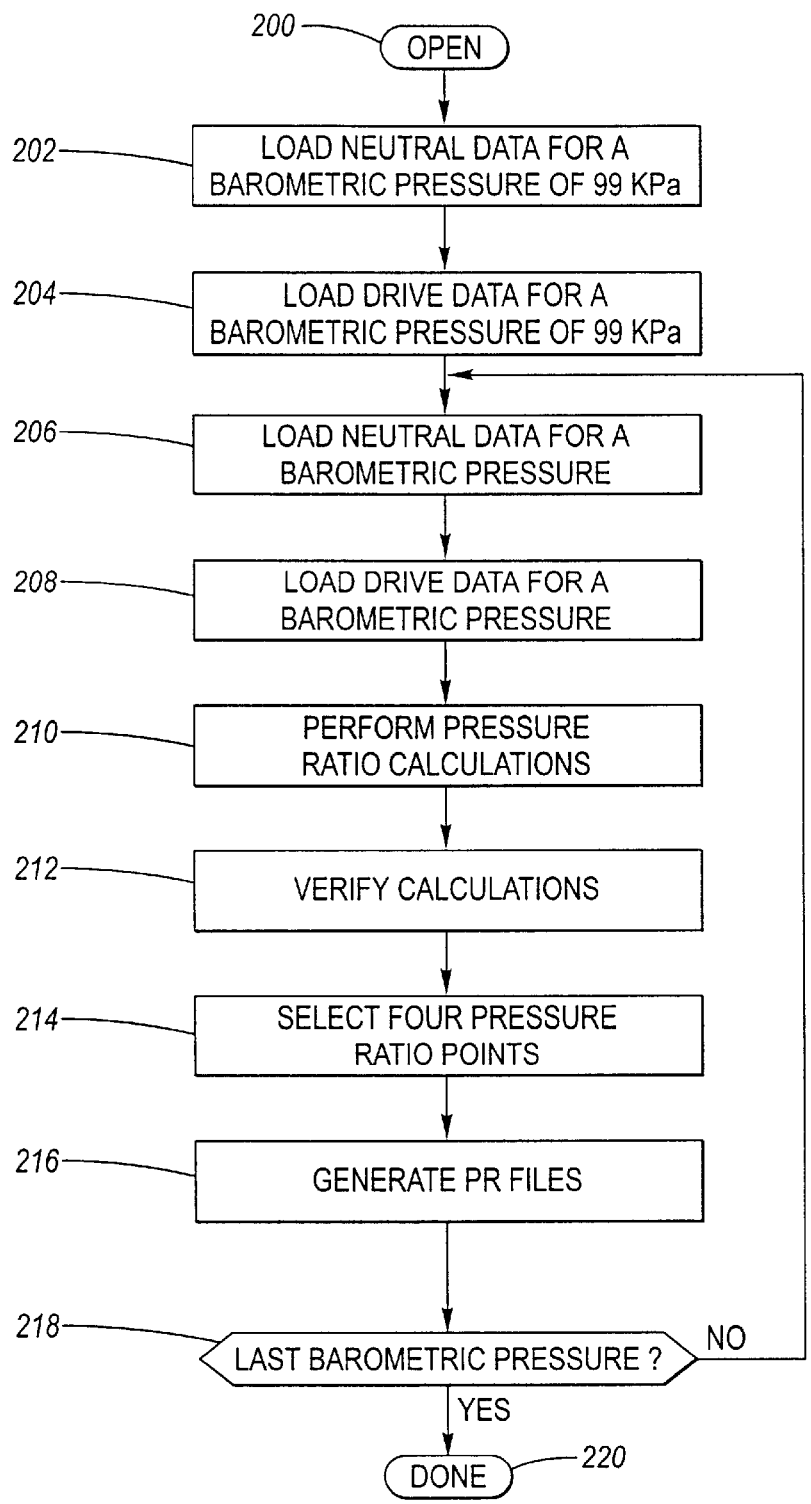

The automated calibration procedure for the data obtained from the procedures of FIGS. 3 and 4 is depicted in FIGS. 5A through 5D after which the results are implemented into the power train control module in the vehicle. In FIG. 5A, the pressure ratio files are opened at block 200. Neutral data for a barometric pressure of 99 KPa is loaded at block 202 while drive data for a barometric pressure of 99 KPa is loaded at block 204. Neutral data for a barometric pressure is then loaded at block 206 while drive data for a barometric pressure is then loaded at block 208. Pressure ratio calculations are performed at block 210 and verified at block 212. Four pressure ratio points are selected from plots similar to FIG. 2 at block 214 and pressure ratio files are generated at block 216. If the last barometric pressure has not been utilized, decision block 218 transfers control to block 206. Otherwise, the procedure ends at block 220.

In FIG. 5B, the torque files are opened at block 250 after which the torque data is loaded at block 252 and purged at block 254. A quadratic regression on the data is executed in block 256 and verified in block 258. A plot of the calculated regression errors is generated in block 260 and verified in block 262. The torque calibration files are then generated at block 264.

Figure 5C:
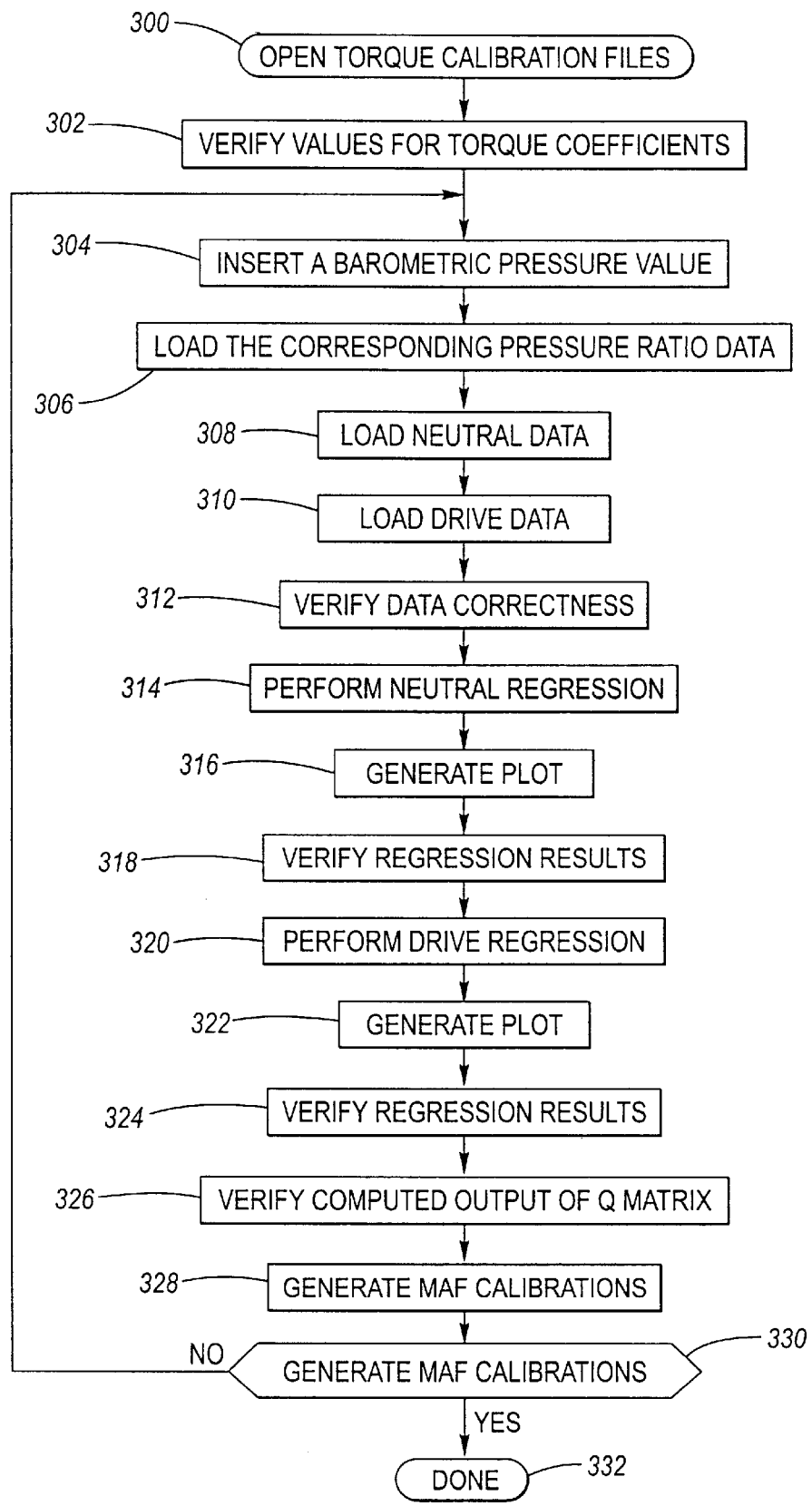

MAF calibrations are performed in FIG. 5C. The torque calibration files are opened at block 300 and the values of the torque coefficients are verified at block 302. A barometric pressure is chosen in block 304. The corresponding pressure ratio data is loaded at block 306. The neutral data is loaded at block 308, the drive data is loaded at block 310, and the correctness of the data is verified at block 312. A regression is performed on the neutral data in block 314, a plot is generated in block 316, and the regression results are verified at block 318. A regression is performed on the drive data in block 320, a plot is generated in block 322, and the regression results are verified at block 324. At block 326, the computed output of Q matrix is verified and MAF calibrations are generated at block 328. If the last barometric pressure has been utilized, the procedure ends at block 330. Otherwise, control is transferred to block 304.

Figure 5D:
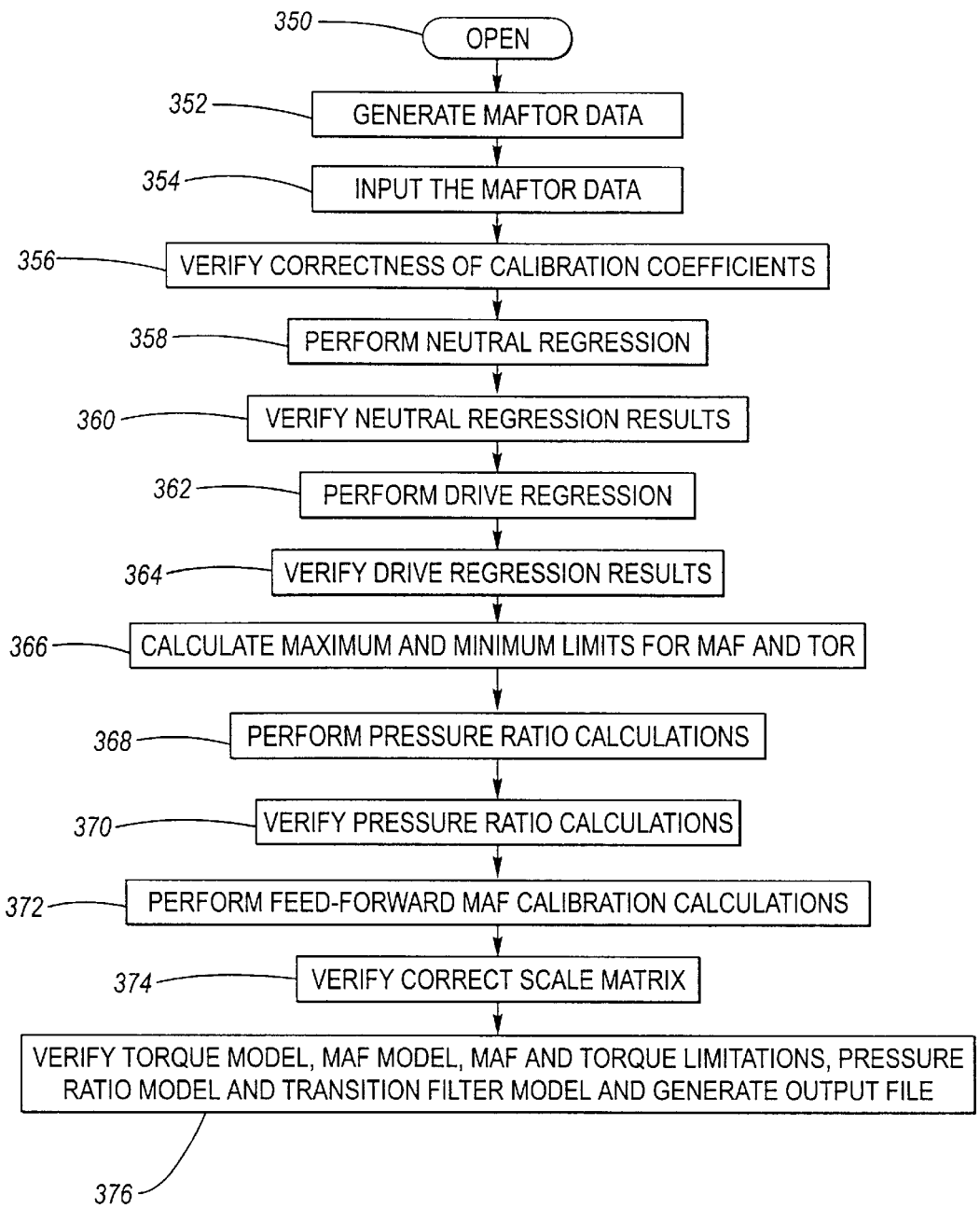

In FIG. 5D, the calibration files are opened at block 350. MAF and torque data is generated at block 352, input at block 354, and the correction of the calibration coefficients are verified at block 356. A regression is performed on the neutral data in block 358 and the regression results are verified at block 360. A regression is performed on the drive data in block 362 and the regression results are verified at block 364. At block 368, the maximum and minimum limits for MAF and TOR (torque) are calculated. Pressure ratio calculations are performed at block 368 and verified at block 370. Feed-forward MAF calibration calculations are performed at block 372 and the correct scale matrix is verified at block 374. At block 376, the torque model, MAF model, pressure ratio model, transition filter model, and MAF and torque limitations are verified and an output file is generated. This file can than be implemented into the power train control module in the vehicle.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A load compensator for an internal combustion engine speed control system including a predetermined torque model, said load compensator comprising:
   pressure ratio model means for defining pressure ratios for compensating altitude effects on a predetermined torque model of an internal combustion engine;
   a torque estimator connected with said pressure ratio model means for determining needed torque of the internal combustion engine responsive to a selected manifold air pressure, a selected spark advance, a selected pressure ratio, and a selected engine speed; and
   a mass air flow estimator connected with said torque estimator for determining mass airflow needed by the internal combustion engine responsive to a selected reference engine speed, a required torque value and a selected barometric pressure.

2. The load compensator of claim 1, further comprising:
   a torque limiter connected with said torque estimator for setting predetermined high and low torque limits on said torque estimator; and
   a mass airflow limiter connected with said mass airflow estimator for setting predetermined high and low mass airflow limits on said mass airflow estimator.

3. The load compensator of claim 2, wherein said pressure ratio model means defines ratios between manifold air pressure at selected air pressures and manifold air pressure derived under predetermined conditions as a function of manifold air pressure and barometric pressure;
   wherein said pressure ratio model means dampens the speed control system of the internal combustion engine for different altitudes, and further substantially eliminates speed oscillations the internal combustion engine under park-drive transitions.

4. The load compensator of claim 3, wherein said mass airflow estimator provides separation of load rejection and steady state control.

5. A speed control system for an internal combustion engine including a predetermined torque model, said speed control system comprising:
   a load compensator comprising:
      pressure ratio model means for defining pressure ratios for compensating altitude effects on a predetermined torque model of an internal combustion engine;
      a torque estimator connected with said pressure ratio model means for determining needed torque of the internal combustion engine responsive to a selected manifold air pressure, a selected spark advance, a selected pressure ratio, and a selected engine speed; and
      a mass air flow estimator connected with said torque estimator for determining mass airflow needed by the internal combustion engine responsive to a selected reference engine speed, a required torque value and a selected barometric pressure, wherein said mass air flow estimator generates a first airflow signal; and
   a control structure comprising:
      an engine speed controller for generating a second airflow signal; and
      a mass airflow controller for generating a commanded mass airflow signal responsive to at least said first and second airflow signals.

6. The speed control system of claim 5, wherein said load compensator further comprises:
   a torque limiter connected with said torque estimator for setting predetermined high and low torque limits on said torque estimator; and
   a mass airflow limiter connected with said mass airflow estimator for setting predetermined high and low mass airflow limits on said mass airflow estimator.

7. The speed control system of claim 6, wherein said pressure ratio model means defines ratios between manifold air pressure at selected air pressures and manifold air pressure derived under predetermined conditions as a function of manifold air pressure and barometric pressure;
   wherein said pressure ratio model means dampens the control system of the internal combustion engine for different altitudes, and further substantially eliminates speed oscillations of the internal combustion engine under park-drive transitions.

8. The speed control system of claim 7, wherein said manifold airflow estimator provides separation of load rejection and steady state control.

9. The speed control system of claim 7, wherein said control structure further comprises:
   desired reference calculation means for providing predetermined desired speed references and current engine speed references;
   a dynamic reference adjuster connected with said desired reference calculation means and said engine speed controller for increasing a reference idle speed of the engine in response to at least one of predetermined engine speed oscillations, a predetermined throttle drop and a predetermined failure mode;
   a feed-forward controller for anticipating predetermined operating conditions of the engine in response to predetermined loads, said feed-forward controller generating a third airflow signal;
   a bias corrector for providing a fourth airflow signal responsive to a mass airflow difference between the commanded mass airflow and a measured mass airflow;
   throttle drop logic means connected with said bias corrector for generating a throttle drop signal responsive to throttle information and the mass airflow difference;
   a convertor connected to said mass airflow controller for transforming the commanded mass airflow signal into a commanded throttle position and an estimated bias of control; and a spark control for generating a base idle spark for neutral and drive transmission operating conditions and for spark correction responsive to engine speed error;

wherein said commanded airflow signal is responsive to said first, second, third and fourth airflow signals.

10. A method for providing load compensated speed control of an internal combustion engine, said method comprising the steps of:

providing a predetermined torque model for the internal combustion engine via dynamometer based calibrations;

generating pressure ratios for compensating altitude effects on the predetermined torque model;

determining needed torque of the internal combustion engine within predetermined high and low torque limits responsive to a selected manifold air pressure, a selected spark advance, a selected pressure ratio, and a selected engine speed;

determining mass airflow needed by the internal combustion engine within predetermined high and low mass airflow limits responsive to a selected reference engine speed, a required torque value and a selected barometric pressure;

generating a first airflow signal responsive to said step of determining mass air flow;

generating a second airflow signal responsive to predetermined engine speed data; and generating a commanded mass airflow signal responsive to at least said first and second airflow signals.

11. The method of claim 10, further comprising the steps of:

generating a third airflow signal responsive to anticipation of predetermined operating conditions of the engine under predetermined loads; and generating a fourth airflow signal responsive to a mass airflow difference between the commanded mass airflow and a measured mass airflow;

wherein said step of generating a commanded airflow signal is responsive to said first, second, third and fourth airflow signals.

12. The method of claim 11, further comprising the step of generating a base idle spark for neutral and drive transmission operating conditions and for spark correction responsive to engine speed error.

* * * * *